UNITED STATES PATENT OFFICE.

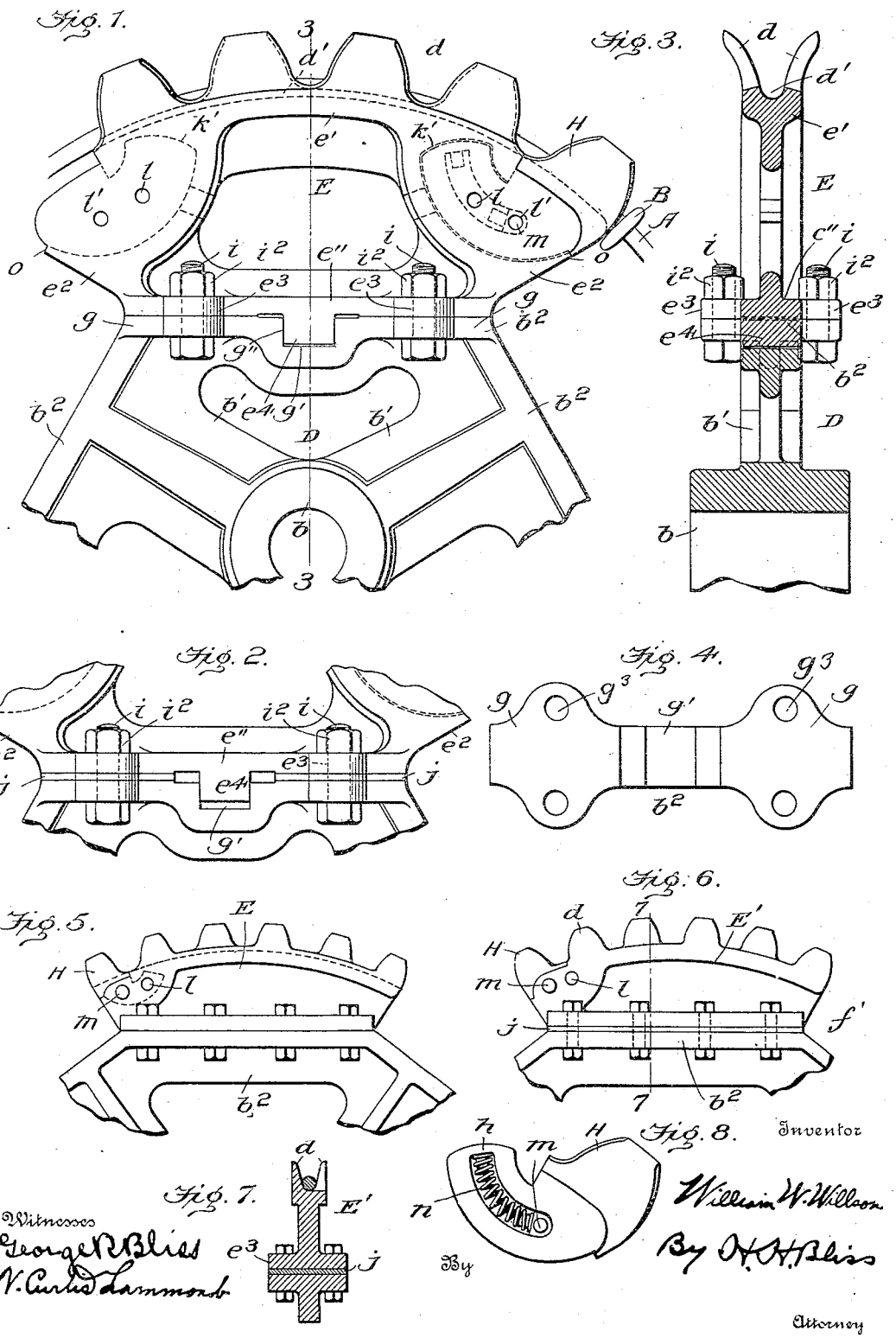

WILLIAM W. WILLSON, OF COLUMBUS, OHIO, ASSIGNOR, BY MESNE ASSIGNMENTS, TO THE JEFFREY MANUFACTURING COMPANY, A CORPORATION OF OHIO.

SPROCKET-WHEEL.

948,385.  Specification of Letters Patent.  Patented Feb. 8, 1910.

Application filed April 26, 1907. Serial No. 370,394.

*To all whom it may concern:*

Be it known that I, WILLIAM W. WILLSON, a citizen of the United States, residing at Columbus, in the county of Franklin and State of Ohio, have invented certain new and useful Improvements in Sprocket-Wheels, of which the following is a specification, reference being had therein to the accompanying drawing.

This invention relates to power transmission apparatus in which a wire rope or cable is employed as the endless traveling member; and it consists of improvements in the wheels with which the cable engages.

The advantages incident to the use of cables, in lieu for instance of chains, have long been recognized, but they are subject to this disadvantage, that the length of the cable is subject to considerable variation, owing to the stretching thereof under the conditions of severe and long continued use, as well as to expansion and contraction under the variations of temperature. Such changes of course affect the pitch of the cable and unless the pitch of the wheel with which the cable engages be varied, the cable and wheel do not work well together.

The object of my invention is to produce a wheel for use in power transmission systems by having adjustable rim sections with which the cable is adapted to engage, as is illustrated in the drawings and will be hereinafter pointed out.

Figure 1 is a side elevation of a wheel embodying my invention. Fig. 2 is an elevation of part of a wheel on which the rim section has been set out. Fig. 3 is a section taken on the line 3—3 of Fig. 1. Fig. 4 is a plan view of the part of the wheel that constitutes the seat for the adjustable cable-engaging section. Fig. 5 is an elevation of part of the wheel containing an embodiment of my invention differing in details of construction from the forms shown in the views already described. Fig. 6 is an elevation of the part of the wheel represented in Fig. 5, the cable-engaging section being set out. Fig. 7 is a sectional view taken on the line 7—7 of Fig. 6. Fig. 8 is a view of the yielding sprocket tooth, detached.

In the drawings, A represents a cable, B the contact members or blocks applied thereto, said cable being adapted to carry flights or other conveying attachments.

The wheel with which the cable engages comprises essentially a central or body portion D and a series of separable and adjustable segments E secured thereto, the latter being separated from each other by gaps $f'$, and being the parts of the wheel with which the cable directly engages. The body portion of the wheel comprises a hub $b$, radiating arms or spokes $b'$, and a rim or peripheral portion $b^2$. The latter is formed into a number of broad bearing surfaces constituting seats upon which rest, and to which are secured, the separable segments E. Each of these segments is provided with a series of staggered teeth $d$, between which is a groove $d'$ in which rests the cable. The segments E and the gaps $f'$ separating them are comparatively long, as is customary in wheels of this character, and the contact blocks occupy the gaps as the cable passes around the wheel. It is evident that if the cable stretches the distance between adjacent blocks is increased, and it is therefore necessary, if the cable is to properly coöperate with the wheel, that the pitch of the latter shall be increased proportionately to the stretching of the cable.

The bearing surfaces upon which the segments E rest are preferably disposed in planes coinciding with chords of a circle struck from the center of the wheel. Each bearing is preferably formed of two relatively broad surfaces at $g$, $g$, separated by a depression or cavity $g'$. The walls $g''$ of the cavity are plain and parallel with each other so as to constitute guides for giving proper position to the segment when seated upon the rim of the wheel and for directing its radial movements when it is adjusted. Each of the bearings $g$ is expanded laterally beyond the edges of the rim portion $b^2$ of the wheel, as indicated in Figs. 3 and 4, and is perforated as indicated at $g^3$.

Each segment E consists essentially of a curved rim portion $e'$ carrying the teeth $d$, a chord-like base $e''$, and web-like parts $e^2$ uniting at their ends the parts $e'$, $e''$. The base $e''$ of the segment is shaped to fit the bearings $g$, $g$, on the wheel rim, that is to say it has laterally expanded perforated portions or lugs $e^3$. Bolts $i$ and nuts $i^2$ are employed to unite the segments to the wheel body. A projection, in the form of a block $e^4$, fitting the recess $g'$, extends from the lower face of the base of the segment and operates to assist in holding the segment in place and directing its movements when it is adjusted.

$j, j$, represent shims or liners adapted to be interposed between the bearing surfaces $g$ and the opposing bearing surfaces of the base $e''$ of the cable-engaging segment, as indicated in Fig. 2. By employing liners of proper thickness the segments can be properly set out to increase the pitch of the wheel, as may be required by the stretching of the cable. The wheel thus far described is very simple in construction and easy of manufacture, and the segments may be easily and quickly adjusted to any desired extent by the very simple expedient of employing shim plates or liners, which can be found in all establishments, or may be made out of metal at hand wherever machinery is being used.

In Figs. 5, 6 and 7 I have represented a form of my invention differing somewhat from that just described, principally in that the recess or cavity $g'$ in the wheel rim, and the projection that fits such recess are not present. The rim $E'$ of Figs. 5, 6 and 7 is likewise of somewhat different construction from that shown in the other views, but these differences are not important and need not be further referred to.

Referring again to the construction shown in Fig. 1, H indicates a yielding sprocket tooth arranged to engage directly with the bearing blocks B on the cable. This yielding tooth is similar in construction and operation to the yielding sprocket described, shown and claimed in Patent 649,563 to W. W. Wilson, dated May 15, 1900, and hence need not be herein described, nor need its advantages be pointed out. The curved shank or stem $h$ of the yielding sprocket is adapted to enter a chamber $k'$ formed in the web portion $e^2$ of the adjustable segment E. This segment is perforated at $l, l'$, and the pivot pin or bolt $m$ that unites the sprocket tooth with the segment E passes through one or the other of the sets of perforations, accordingly as the tooth is used upon a driving or a driven wheel. It is well understood that a tooth of this character is arranged at the forward edge of the cable-engaging segment when applied to a driving wheel and to the rear end of the segment when upon a driven wheel; and also that the spring $n$ that operates upon the tooth is so located as normally to retract or hold inward the tooth when it operates as a driver, but to extend or force it outward when it is on a driven wheel. In order that the segment may be used either upon a driving or a driven wheel, as may be desired, the web portion $e^2$ at each end of the segment is chambered and adapted to receive a yielding sprocket tooth. And the walls of both these sockets are formed with two sets of perforations $l, l'$, the inner set $l$ receiving the pivot pin $m$ when the sprocket is applied for driving purposes, and the outer set $l'$ being used when the sprocket is applied to a driven wheel.

The web portions $e^2$ of the segmental rim sections E extend outward at either end beyond the base $e''$ in order to constitute a bearing $o$ for the yielding sprocket tooth.

What I claim is:

1. A sprocket wheel for use with a power transmission cable, comprising a body portion formed with a series of regularly arranged bearing surfaces extending laterally outward beyond the rim of the body portion of the wheel, a series of separable sections with which the cable directly engages arranged to rest upon and be secured to the said bearing surfaces of the wheel, the said sections being separated from each other by gaps, nuts and bolts for uniting the separable sections to the wheel body, passing through the said laterally extending bearings and through the parts of the sections resting directly thereon, and a yielding sprocket tooth carried by each of the said separable sections, substantially as set forth.

2. A sprocket wheel for use with a power transmission cable, comprising in combination a body portion formed with a series of laterally extending flanges to form a corresponding series of bearing faces, each of said bearing faces having a straight-sided recess, a series of separable toothed sections with which the cable directly engages arranged upon the said bearing faces, each section having a tongue to engage the groove of the bearing face and being separated from the adjacent sections by gaps, and means for securing the separable sections to the wheel body comprising bolts passing through the said laterally extending flanges and the parts of the sections resting directly thereon, substantially as set forth.

3. A sprocket wheel for use with a power transmission cable, comprising in combination a central body portion having a series of pairs of laterally extending flanges forming a corresponding series of bearing faces, the flanges of each pair being separated by a groove $g'$, a series of separable toothed sections with which the cable directly engages, having flanged base portions shaped to fit the flanges of the said body portion and each formed with a tongue $e^4$ adapted to fit a groove $g'$, and means for securing the sections to the wheel body comprising bolts extending through the laterally extending flanges of the body and the flanged base portions of the sections, substantially as set forth.

4. A sprocket wheel for use with a power transmission rope or strand cable, comprising a central body portion and a series of separable sections with which the cable directly engages, each section being constructed to receive at each end a yielding sprocket tooth, means for uniting the sections to the wheel body, and a yielding tooth secured to each section, substantially as set forth.

5. A sprocket wheel for use with a power transmission rope or strand cable, comprising a central body portion, a series of separable sections with which the cable directly engages, each section consisting of a curved rim portion carrying teeth, a base and connecting web parts $e^2$, the latter being recessed or chambered to receive the yielding sprocket tooth, substantially as set forth.

In testimony whereof I affix my signature, in presence of two witnesses.

WILLIAM W. WILLSON.

Witnesses:
FRANK T. TALBOT,
H. B. ALEXANDER.